United States Patent

[11] 3,607,280

| [72] | Inventor | Richard F. Durchholz |
| | | Loveland, Ohio |
| [21] | Appl. No. | 862,822 |
| [22] | Filed | Oct. 1, 1969 |
| [45] | Patented | Sept. 21, 1971 |
| [73] | Assignee | The Procter & Gamble Company |
| | | Cincinnati, Ohio |

[54] A SINGLE COLUMN CIRCULATORY COFFEE EXTRACTION PROCESS
6 Claims, 2 Drawing Figs.

[52] U.S. Cl. ............................................................ 99/71
[51] Int. Cl. ............................................................ A23f 1/08
[50] Field of Search ................................................. 99/71

[56] References Cited
UNITED STATES PATENTS

| 2,888,349 | 5/1959 | Morrow et al. | 99/71 |
| 3,224,879 | 12/1965 | DiNardo | 99/71 |

Primary Examiner—Tim R. Miles
Assistant Examiner—William L. Mentlik
Attorney—Edmund J. Sease ABSTRACT: A novel process for producing instant coffee extract utilizing apparatus which comprises a surge tank connected in a circulatory system with a single extraction column. Extract product is produced by manipulating the extract surge by circulating it through the extraction column and varying the extract and water temperatures previous to extraction and hydrolysis.

INVENTOR.
Richard F. Durchholz

ATTORNEY 3,607,280

A SINGLE COLUMN CIRCULATORY COFFEE EXTRACTION PROCESS

BACKGROUND OF THE INVENTION

Conventional instant coffee processing utilizes a countercurrent extraction process. In this process a series of extraction columns connected by liquid inlet and liquid outlet lines are utilized. Usually there are 5 to 8 columns; the height can vary from 6 to 20 ft. and the diameter can vary from 1 to 4 ft. Hot water at hydrolyzing temperatures, generally above 300° F., enters the column containing coffee grounds that are most spent and progressively moves upward through each column of lesser spent coffee grounds. The flow is in series through each column; the extract, moving forward continuously, fills the interstitial voids between the grounds in the freshest coffee column, simultaneously wetting the grounds and displacing gasses from the column. The coffee extract leaves the freshest column of roast and ground coffee as a syrup having a concentration of coffee solubles ranging from 20 to 45 percent. The hot feed water flows continuously into the column containing the most spent coffee grounds. Extract from the freshest roast and ground coffee column is withdrawn intermittently.

Generally in progressing sequentially from the column containing the most spent coffee grounds to the column containing the freshest coffee grounds lower extraction temperatures are employed. This is done to insure that the most flavorful solubles extracted from the freshest roast and ground coffee are not destroyed by subjection to high hydrolyzing temperatures. Thus, by using a countercurrent extraction method employing a plurality of columns an extract having a high percentage of coffee solubles is obtained without destroying the flavor of the coffee solubles extracted from the freshest roast and ground coffee. Heretofore, the advantages of a countercurrent extraction system have been unobtainable by utilizing any other extraction system; thus instant coffee producers are nearly all employing this method.

While countercurrent extraction has the advantage of providing high yields and high concentration of extract without seriously affecting flavor qualities, there are certain disadvantages to the countercurrent extraction method. First, the process time is generally quite long, i.e., within the range of about 3 to 4 hours. As used here "process time" begins when extract enters a particular column of fresh roast and ground coffee and ends when that column of coffee is discharged and has been taken off stream. In addition to the lengthy process time, installation of a countercurrent extraction system, because of the plurality of columns employed, involves a high initial capital cost. Moreover, because of the multiplicity of columns a high degree of technical skill is required in operating such a system. Finally, utilization of a series of columns each containing roast and ground coffee having a different degree of spentness often results in pressure problems within the system necessitating a reversal in flow through the columns which disrupts the normal operation of the system.

While some attempts have been made to overcome the deficiencies of a conventional countercurrent extraction system, little work has been done in regard to developing additional extraction system, i.e., high yields, high extract concentration, and minimal flavor deterioration, and which eliminate the disadvantages of a countercurrent extraction system as enumerated above.

One recent alternative to a countercurrent extraction system is shown in Morrow, U.S. Pat. No. 2,888,349, issued May 26, 1959. The Morrow patent discloses utilization of a surge tank in combination with a single extraction column to produce coffee extract. While the MOrrow single column extraction method is satisfactory, it has certain disadvantages. First, as shown at column 3, lines 73–75 the solubles yield is approximately 27 percent which is significantly lower than the yield of about 35 to 45 percent which is obtained by employing efficiently a countercurrent extraction system. It is believed that the low yields obtained in the Morrow process occur because his extraction system is a noncirculatory system, that is to say, the extract flows from the extraction column into the surge tank only once during his process, and because Morrow utilizes fresh water to extract hydrolysates from previously extracted coffee grounds.

Accordingly, it is an object of this invention to provide a circulatory single column extraction process wherein extract yields of at least 35 percent are obtainable, wherein a hydrolysate containing extract is utilized to extract fresh roast and ground coffee and wherein the advantages of countercurrent extraction are obtained without the attendant disadvantages.

The accomplishment of this and other objects will become apparent from the following description of the invention.

SUMMARY OF THE INVENTION

This invention relates to a single column circulatory coffee extraction process whereby an extract yield of at least 35 percent is produced, said process comprising:

a. introducing hydrolysate containing coffee extract from a surge zone into a temperature adjusting zone wherein said extract temperature is adjusted to within the range of from 300° to 360° F. and thereafter introducing the temperature adjusted extract into an extraction zone containing partially extracted coffee grounds and continuously circulating said extract through said extraction zone, said surge zone and said temperature adjusting zone for from 5 to 15 minutes to hydrolyze coffee solids, and thereafter stopping said circulation so that only a small amount of extract remains in said surge zone and a major portion remains in said extraction zone;

b. introducing fresh water into said temperature adjusting zone wherein said water is adjusted to a temperature within the range of from 300° to 360° F. and thereafter introducing said water into said extraction zone to wash hydrolyzed solids out of said extraction zone and whereby extract in said extraction zone is circulated into said surge zone;

c. removing spent grounds and wash water from said extraction zone and filling said extraction zone with fresh roast and ground coffee;

d. circulating extract from said surge zone through said temperature adjusting zone wherein said extract temperature is adjusting zone wherein said extract temperature is adjusted to within the range of from 180° to 250° F. and introducing said extract into said extraction zone to extract flavor components from fresh coffee grounds, and thereafter drawing off extract at a draw off ratio of from 1.0 to 4.0.

DETAILED DESCRIPTION OF THE INVENTION

The single column circulatory coffee extraction process described herein must be preceded by a startup operation which will be described herein in detail prior to a description of the process.

Figure 1:
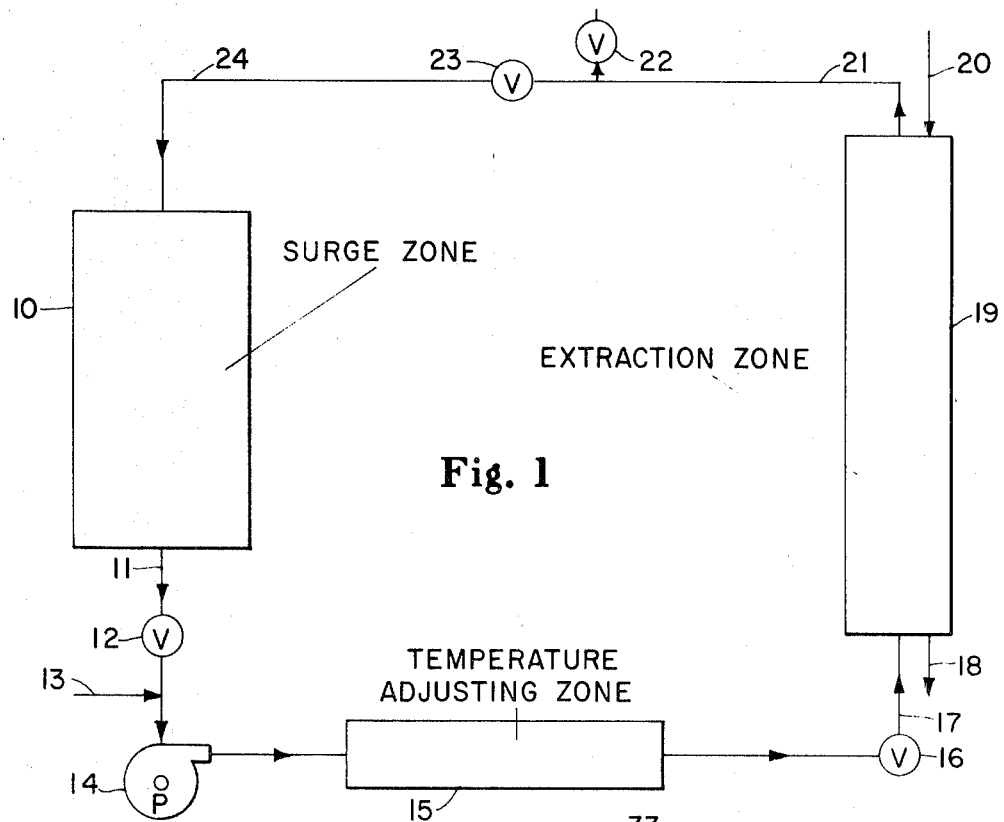
FIG. 1 is a flow chart outlining the single column circulatory coffee extraction process of this invention.

Speaking with continuing reference to FIG. 1, in order to subject the coffee to the proper sequence of operations the passage of water or extract through the inlet and outlet pipes or lines, the two terms being used herein interchangeably, is controlled by valves 12, 16, 22 and 23 on lines 11, 17, 21, and 24 respectively.

In the startup procedure extraction zone 19 is initially charged through coffee inlet line 20 with fresh roasted and ground coffee; thereafter coffee inlet line 20 is closed by a valve not depicted in FIG. 1. The water inlet line 13 is open. Fresh water enters the system and is pumped by pump 14 through the temperature adjusting zone 15, and through open valve 16 on extract inlet line 17, into extraction zone 19. As a result of passage through the temperature adjusting zone 15, the temperature of the incoming water is raised to a level ranging from 180° to 250° F. and preferably from 190° to 230° F. Extraction occurs as soon as the water at this temperature contacts fresh coffee grounds in extraction zone 19 and extract is produced. This extract is immediately displaced by more incoming temperature adjusted water; thus the extract is caused to flow up through the extraction zone 19 and into extraction zone exit line 21. During this initial extraction, valve 23 on surge zone inlet line 24 is closed and draw off valve 22 is open. A predetermined amount of initial extract is drawn off through valve 22 and set aside; valve 22 is then closed. Thereafter valve 23 is opened, water inlet line 13 is closed by a valve not depicted, and valve 12 is opened. Temperature adjusting zone 15 (most commonly a heat exchanger) is manipulated to provide hydrolyzing temperatures within the range of 300° to 360° F. and preferably from 330° to 355° F. and the remaining water in the system is circulated through extraction zone 19 containing partially extracted coffee grounds, surge zone 10 and temperature adjusting zone 15 until the temperature in extraction zone 19 is approximately the same as the temperature in temperature adjusting zone 15. Thereafter valve 12 is closed and water inlet line 13 is opened and fresh water is pumped by pump 14 through temperature adjusting zone 15, wherein it is adjusted to hydrolyzing temperatures, and into extraction zone 19 wherein hydrolysate containing coffee extract is extraction zone 19 is displaced by incoming water and caused to flow into surge zone 10 wherein extract is collected until surge zone 10 is filled at which time water inlet line 13 is closed. Spent grounds are removed from extraction zone 19 through spent grounds discharge line 18 and thereafter extraction zone 19 is charged with fresh roast and ground coffee through coffee inlet line 20 which is thereafter closed by a valve, not shown in FIG. 1.

Speaking now with reference to the invention as described in the SUMMARY OF THE INVENTION, startup has progressed to a point where the circulatory extraction process can begin with step (d) and thereafter steps (a), (b), (c) and (d) are repeated until the desired quantity of extract has been collected.

As is apparent from the foregoing, because the extraction process of this invention is circulatory, startup can logically end with the beginning of step (d) or preferably includes at least one completion of step (d) because equilibrium is more nearly approached. As those skilled in the extraction art know, attaining true equilibrium in an extraction system can only be accomplished after many complete cycles and, in regard to startup of this process, equilibrium within the system is more nearly approached if startup includes the above described steps as well as one completion of step (d) of the process. In other words, after charging extraction zone 19 with fresh roast and ground coffee, valve 12 is opened and valve 22 is opened and extract from surge zone 10 is circulated through temperature adjusting zone 15, wherein the extract temperature is adjusted to within the range of from 180° to 250° F., introduced into extraction zone 19 wherein flavor extraction of fresh roast and ground coffee occurs and incoming extract from surge zone 10 displaces extract in extraction zone 20 which is withdrawn through draw off valve 22 until a predetermined amount is accumulated; thereafter valve 22 is closed. After draw off the extract now within the system is a partially concentrated extract and is hereinafter referred to as a hyrdolysate containing extract because it contains a small percentage of hydrolysates. After the above draw off valve 12 is closed and hydrolysate containing extract is pumped into surge zone 10. At this point surge zone 10 contains hydrolysate containing extract and extraction zone 19 contains partially extracted coffee grounds. At this point the first step (step a) of the process of this invention can be accomplished.

After the hereinbefore described startup procedure a partially concentrated hydrolysate containing coffee extract is present in the surge zone 10. In the first step of the process of this invention, valve 12 is opened, water inlet line 13 is closed, valve 16 on extract inlet line 17 is open, draw off valve 22 is closed and valve 23 is opened. The hydrolysate containing coffee extract present in surge zone 10 passes into drain line 11, through pump 14, and through temperature adjusting zone 15 wherein the extract is adjusted to a temperature within the range of from 300° to 360° F. and preferably from 330° to 355° F. These temperatures are hydrolyzing temperatures and therefore after passing through temperature adjusting zone 15 and into extraction zone 19 containing partially extracted coffee grounds hydrolysis immediately begins to occur. While maintaining the above enumerated conditions, the hydrolysate containing coffee extract is pumped in a continuous circulatory fashion through extraction zone 19 into surge zone 10 and through temperature adjusting zone 15 for a period of time ranging from 5 to 15 minutes and preferably from 7 to 10 minutes. During this period of time, the partially extracted coffee grounds contained in extraction zone 19 undergo hydrolysis reactions whereby the percentage of soluble solids in the extract is increased. Because of the soluble solids obtained in this step are obtained from partially extracted coffee grounds, they are mostly hydrolysates and therefore neutral or bland in taste. After circulation for a period of time within the hereinbefore described time range is completed, circulation is stopped. At this point only a small amount of extract remains in surge zone 10 and a major portion remains in extraction zone 19. The first step of the circulatory coffee extraction process of this invention has now been completed.

In the second step (step b) of the process of this invention, valve 12 is closed, water inlet line 13 is opened, valve 16 on the extract line 17 remains open, draw off valve 22 is closed and valve 23 is opened. Fresh water from water inlet line 13 is introduced into the system and pumped through temperature adjusting zone 15 wherein the temperature is increased to within the range of from 300° to 360° F. and preferably from 330° to 355° F. Thereafter temperature adjusted water is introduced into extraction zone 19 wherein residual hydrolyzed solids are washed out of extraction zone 19 and whereby the fresh water containing residual hydrolyzed solids is circulated into surge zone 10 wherein it remains because surge drain 11 is closed by valve 12. The amount of fresh water added is a sufficient amount to fill surge zone 10. This completes the second step of the process of this invention.

In regard to the amount of fresh water introduced into the system in the second step of this invention, step (b), no special criticality exists; however, as a general rule the amount of water introduced into the extraction system in step (b) should be an amount sufficient to fill surge zone 10, at which point fresh water introduction is stopped. Likewise as a general rule the amount of draw off after a complete cycle (i.e. steps a, b, c and d) should be such that the amount of water present in the draw off plus the amount of water removed with the spent grounds in step (c) is approximately equal to the amount of water introduced into the system in step (b). In actual process operation the water introduction step (step b) and the hereinafter described draw off step (step d) is accomplished simply by introducing fresh water in step (b) until surge zone 10 is filled as evidenced by examination through a sight glass, and in the case of step (d) drawing off extract until surge zone 10 is nearly empty as evidenced by examination through a sight glass.

In the third step (step c) of the process of this invention valves 12, 16, 22 and 23 all are closed. The water inlet line 13 is also closed. The spent grounds contained in extraction zone 19 are removed or discharged through spent grounds discharge line 18 and thereafter line 18 is closed. Coffee inlet line 20 is opened and extraction zone 19 is charged with fresh roast and ground coffee; thereafter coffee inlet line 20 is closed. This completes the third step of the process of this invention.

In the fourth step (step d) of the process of this invention valve 12 is opened, water inlet line 13 is closed, valve 16 is opened, valve 22 is opened and valve 23 is closed. The hydrolysate containing coffee extract present in the surge zone 10 drains into pump 14 wherein it is pumped through temperature adjusting zone 15 and the temperature is adjusted to within the range of 180° to 250° F. and preferably from 190° to 230° F. Thereafter, the hydrolysate containing coffee extract having a percentage of water solubles of about 12 percent is pumped through extraction zone 19 now containing a fresh charge of roast and ground coffee. The extract, after passing through extraction zone 19 is drawn off (until surge zone 10 is nearly empty) through draw off valve 22 for subsequent concentration and drying by conventional means as described in Sivetz, Vol. 1, Chapters 11 and 12, 1963 ed. by Avi Publishing Co.; draw off valve 22 is closed and extraction zone 19 now contains partially extracted coffee grounds. Subsequently the hydrolyzing process of the first step of this invention can again be repeated and thereafter the subsequent steps can be repeated sequentially until the total amount of desired extract has been drawn off.

Draw off ratio as that term is used in the coffee processing art refers to the weight ration of extract drawn off compared to the weight of roast and ground coffee employed in the extraction column. In regard to the fourth step of the process of this invention, the draw off ratio should be within the range of 1.0 to 4.0 and preferably from 1.5 to 2.5. Draw off ratios within the above broader range are essential to provide satisfactory extract yields and extract concentrations. If the draw off ratio is lower than 1.0 the yield is so low as to be uneconomical; on the other hand, if the draw off ratio is greater than 4.0 the extract concentration is so low that concentration and drying become very difficult. Utilization of the preferred draw off ratios of from 1.5 to 2.5 is best from a processing efficiency standpoint in that yields of above 35 percent are consistently produced at concentration levels which cause no difficulties in regard to subsequent concentrating and drying steps.

In the previously described fourth step, the extraction which occurs is analogous to fresh coffee flavor extraction in the newest online column in a countercurrent extraction system. The hydrolysate containing extract is pumped through the extraction zone wherein approximately from 8 to 14 percent soluble solids are extracted from the fresh roast and ground coffee. After this fresh extraction process the level of soluble solids ranges from about 20 to about 26 percent and as can be seen upon careful analysis of the foregoing description the extract is similar to an extract drawn off from a countercurrent extraction system in that hydrolysates were obtained from partially extracted coffee grounds under high temperature conditions and thereafter fresh flavor extractable components were obtained from fresh coffee grounds by utilization of milder temperature conditions; therefore, the flavorful components last obtained have not been subjected to severe hydrolysis conditions and consequently no major flavor loss has occurred. Thus, the single column circulatory coffee extraction process has accomplished the same result as the countercurrent extraction process by utilization of a single column and a total process time within the approximate time range of from about 30 minutes to about 40 minutes as compared to countercurrent process times for a 6-column system of approximately 3 to 4 hours.

As is apparent from the accompanying drawing, extraction zone 19 will generally be an extraction column not unlike those columns presently in use in countercurrent extraction systems. Columns of sufficient size to give satisfactory levels of draw off generally have diameters from about 18 to 28 inches and lengths of from about 10 to about 15 feet.

Surge zone 10 can be a conventional surge tank, the utilization and availability of which is readily known.

A description of an apparatus used to practice the process of this invention will now be set forth herein.

Figure 2:
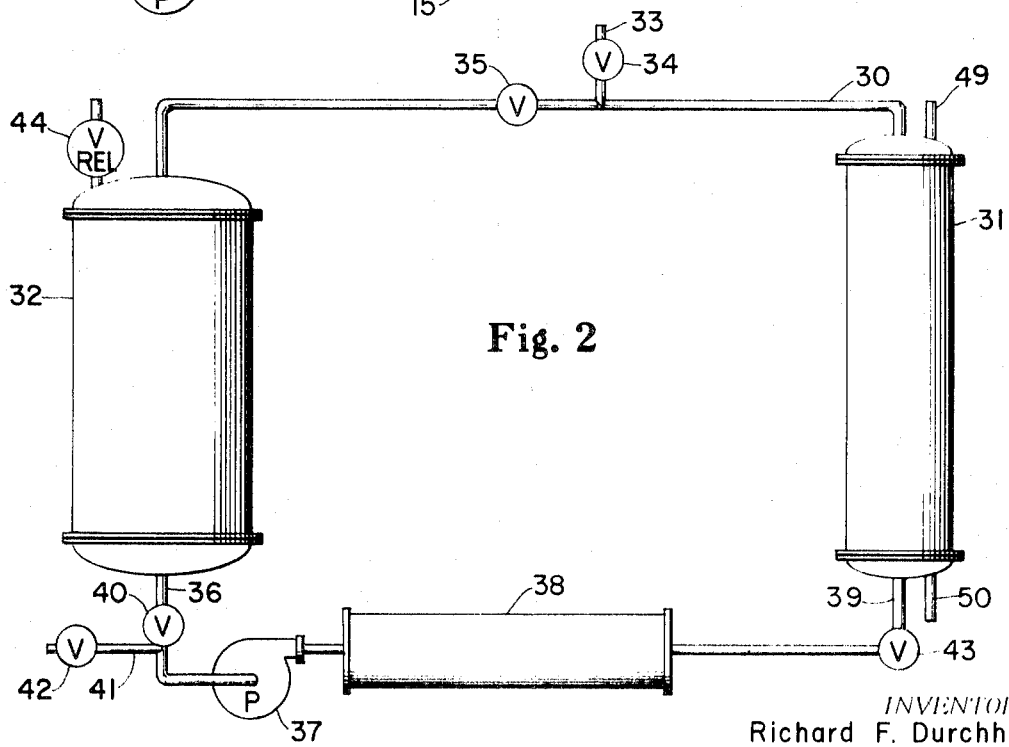
FIG. 2 is a schematic representation of an apparatus for practicing the process of this invention.

With continuing reference to FIG. 2 the upper portion of the circulatory flow system comprises an exit pipe line 30 from the top of extraction column 31 in communication with the top of surge tank 32. This line is interrupted in its midportion by draw off line 33 and draw off valve 34 and an online valve 35. Valves 34 and 35 can direct the circulatory flow from extraction column 31 to surge tank 32 or to draw off line 33. Extraction column 31 is also in communication with coffee inlet line 49.

The lower portion of the flow system comprises a drain line 36 which leads from the bottom of surge tank 32 to pump 37. Pump 37 pumps extract or fresh water through heat exchanger 38 into column inlet line 39. The lower portion of extraction column 31 is in communication with spent grounds discharge line 50.

At the point where drain line 36 leaves surge tank 32 a shutoff valve 40 is positioned. When this valve is closed no flow from surge tank 32 can occur. Directly beneath this valve, water inlet line 41 communicates with drain line 36. Water inlet line 41 can be opened by valve 42 to allow fresh water to enter the system. Where column inlet line 39 enters extraction column 31 another shutoff valve 43 is positioned. This valve is only closed when spent grounds are removed from extraction column 31. The draw off line of the upper portion and the drain line of the lower portion, as well as the column inlet line and discharge line, along with the attendant valves, connecting lines, the surge tank, the pump, the heat exchanger, and the single extraction column comprise the preferred apparatus for practicing the circulatory single column extraction process of this invention.

While not essential, it is preferred that surge tank 32 have a pressure release valve 44. A surge tank having a pressure release valve 44 is preferred because as high temperature, i.e. 300° to 360° F., hydrolysate containing extract enters the tank, wherein atmospheric pressure is maintained by use of pressure release valve 44, flashing of some of the water present in the extract occurs and the vapor is allowed to escape through the surge tank vent. This provides an easy means of partially concentrating hydrolysate containing extract; if the pressure release valve 44 is employed the pressure should be released during step (b) of the process as the process steps are described in the SUMMARY OF THE INVENTION. A surge tank not having a pressure release valve 44 can also be employed with the only difference being that the resulting extract is not as concentrated and the extract must be cooled during step (d) to temperatures within the hereinbefore defined range.

The following example is offered to illustrate the apparatus and process of this invention.

EXAMPLE

With continuing reference to FIG. 2, a single column circulatory extraction system apparatus as shown in FIG. 2 is set up. The surge tank 32 has an inside volume of 66 ft$^3$. As is necessary with all coffee extraction apparatuses, this system is comprised of stainless steel vessels.

The extraction column 32 has a 2.35 feet inside diameter and is 10.0 feet long and has an internal volume of about 50 ft$^3$. Pump 37 is a centrifugal pump having a pump capacity of 45,000 lbs./hr. Heat exchanger 38 utilizes water and steam as the heat exchange fluids.

During startup, 1,000 lbs. of fresh roast and ground coffee is placed in extraction column 31 through coffee inlet line 49. Water inlet line 41 is opened by valve 42 and 3,770 lbs. of fresh water enters centrifugal pump 37 at a rate of 400 lbs./minute. The water passes through heat exchanger 38 wherein it is raised to a temperature of 230° F. Thereafter the water passes through open valve 43 through extract inlet line 39 into extraction column 31. Extraction occurs as soon as the temperature adjusted water contacts the fresh coffee grounds. The resulting extract is immediately displaced by more incoming temperature adjusted water; thus, the extract is caused to flow up through extraction column 31 and into exit pipe line 30. During this initial extraction, valve 35 is closed and valve 34 is open. A predetermined amount, here 1,820 lbs., of the initial extract is drawn off through draw off line 33. Valve 34 is then closed and valve 35 is opened and water inlet line 41 is closed.

Heat exchanger 38 is manipulated to provide a hydrolyzing temperature of 350° F. and the remaining water in the system is circulated through extraction column 31 containing partially extracted coffee grounds, surge tank 32 and heat exchanger 38 until the temperature in the extraction column 31 is approximately the same as the temperature in heat exchanger 38, i.e. 350° F.

Water inlet line 41 is opened by valve 42 and 3,770 lbs. of fresh water is pumped by pump 37 through heat exchanger 38, adjusted to a temperature of 350° F., and pumped into extraction column 31 wherein hydrolysate containing extract is continually displaced by incoming water and caused to flow into surge tank 32 wherein extract is collected until surge tank 32 is filled at which time valve 42 on water inlet line 41 is closed. Spend grounds are removed from extraction column 31 through spent grounds discharge line 50 and extraction zone 31 is charged with fresh roast and ground coffee through inlet line 49. Valve 42 is opened and valve 34 is opened and extract from surge tank 32 is circulated through heat exchanger 38 wherein the extract temperature is adjusted to 230° F., and thereafter introduced into extraction column 32 wherein fresh roast and ground coffee flavor extraction occurs. Extract from surge tank 32 drains into drain line 36 and is pumped by pump 37 through heat exchanger 38 and displaces extract in column 32, 1,820 lbs. of which is withdrawn through draw off valve 34, which is thereafter closed. Startup is now completed and the first step of the process can now be accomplished.

In the first step of the process of this invention valve 40 is open, water inlet line 41 is closed by valve 42, valve 43 is open, valve 34 is closed and valve 35 is open. The partially concentrated hydrolysate containing coffee extract in surge tank 32 passes through drain line 36 and is pumped at a rate of 900 lbs./min. by centrifugal pump 37 through heat exchanger 38 wherein the temperature is adjusted to 350° F. While maintaining a temperature of 350° F. the hydrolysate containing extract is pumped in a circulatory fashion through extraction column 31, surge tank 32 and heat exchanger 38 for 10 minutes after which a hydrolysate containing extract is produced. Circulation is stopped by shutting off pump 37. At this time a majority of the extract is in extraction column 31 and small amounts of the extract remain in surge tank 32. This completes the first step of the process.

Next valve 40 is closed; water inlet line 41 is opened by opening valve 42; valve 43 remains open; valve 34 remains closed, and valve 35 is opened. Fresh water is introduced into the system through water inlet line 41 and pumped through the system at rate of 900 lbs./min. The temperature of the fresh water is adjusted to 350° F. by heat exchanger 38. Then 3,770 pounds of water is pumped into the system after which the spent grounds have been thoroughly washed of residual hydrolyzed solids which is completed when surge tank 32 is filled with extract and wash water. This completes the second step. The present solubles contained in the extract present in surge tank 32 is 12 percent. During this second step operation pressure release valve 44 is closed.

In the third step spent grounds contained in extraction column 31 are removed through spent grounds discharge line 50 and 1,000 lbs. of fresh roast and ground coffee is charged into extraction column 31 through coffee inlet line 49. During this step valve 40 is closed, valve 42 is closed and valves 43, 34 and 35 are closed.

In the last step of the process valve 40 is open, water inlet line 41 is closed; valve 43 is open; valve 35 is closed and draw off valve 34 on draw off line 33 is opened. The hydrolysate containing coffee extract present in surge tank 32 drains into centrifugal pump 37 wherein it is pumped through heat exchanger 38, the temperature is adjusted to 230° F. after which the extract flows into extraction column 31 now containing a fresh charge of roast and ground coffee; thereafter extract is pumped into exit pipe line 30 and drawn off through line 33. The total amount of extract drawn off is 1,820 lbs.; the draw off ratio is 1.82; the solubles concentration is 22 percent and the yield is 40 percent. No pressure problems occur during the entire processing time. The total process time is 27 minutes.

The extract is concentrated by thin film vacuum evaporation to a solubles concentration of 50 percent and is then spray dried to a moisture content of about 3.5 percent in a conventional 6 by 15 foot spray drier using an air inlet temperature of 470° F., and air outlet temperature of 200° F. and a nozzle pressure of 500 p.s.i.g. to provide an instant coffee indistinguishable in taste and appearance from instant coffee produced in a countercurrent process.

When in the above example, in the second step of the process of this invention, pressure release valve 44 is open, it is found that no cooling in heat exchanger 38 is necessary during the fourth step as the hydrolysate containing extract present in surge tank 32 is cooled to 228° F. after completion of the second step. The final extract solubles concentration is increased 1.0 percent to a level of 23.0 percent.

What is claimed is:

1. A single column circulatory coffee extraction process, whereby an extract yield of at least 35 percent is produced, said process comprising:
   a. introducing hydrolysate containing coffee extract from a surge zone into a temperature adjusting zone wherein said extract temperature is adjusted to within the range of from 300° to 360° F. and thereafter introducing said temperature adjusted extract into an extraction zone containing partially extracted coffee grounds and continuously circulating said extract through said extraction zone, said surge zone and said temperature adjusting zone for from 5 to 15 minutes to hydrolyze coffee solids, and thereafter stopping said circulation so that only a small amount of extract remains in said surge zone and a major portion remains in said extraction zone;
   b. introducing fresh water into said temperature adjusting zone wherein said water is adjusted to a temperature within the range of from 300° to 360° F. and thereafter introducing said water into said extraction zone to wash hydrolyzed solids out of said extraction zone and whereby extract in said extraction zone is circulated into said surge zone;
   c. removing spent grounds and wash water from said extraction zone and filling said extraction zone with fresh roast and ground coffee;
   d. circulating extract from said surge zone through said temperature adjusting zone wherein said extract temperature is adjusted to within the range of from 180° to 250° F. and introducing said extract into said extraction zone to extract flavor components from fresh coffee grounds, and thereafter drawing off extract at a draw off ratio of from 1.0 to 4.0.

2. The process of claim 1 wherein in step (a) said extract temperature is adjusted to within the range of from 330° to 355° F.

3. The process of claim 1 wherein in step (a) said temperature adjusted extract is circulated through said extraction zone, said surge zone and said temperature adjusting zone for from 7 to 10 minutes.

4. The process of claim 1 wherein in step (b) said water is adjusted to a temperature within the range of from 330° to 355° F.

5. The process of claim 1 wherein in step (d) said extract temperature is adjusted to within the range of from 190° to 230° F.

6. The process of claim 5 wherein the draw off ratio is from 1.5 to 2.5.